United States Patent
Lee et al.

(10) Patent No.: US 8,711,294 B2
(45) Date of Patent: Apr. 29, 2014

(54) MULTI-MODE 3-DIMENSIONAL IMAGE DISPLAY APPARATUS

(75) Inventors: Sung-Jung Lee, Incheon (KR);
Min-Jung Kim, Incheon (KR);
Eui-Taek Shim, Incheon (KR)

(73) Assignee: Pavoninekorea, Inc., Incheon (KR)

( * ) Notice: Subject to any disclaimer, the term of this patent is extended or adjusted under 35 U.S.C. 154(b) by 181 days.

(21) Appl. No.: 13/510,054

(22) PCT Filed: Sep. 2, 2010

(86) PCT No.: PCT/KR2010/005938
§ 371 (c)(1),
(2), (4) Date: May 16, 2012

(87) PCT Pub. No.: WO2011/074763
PCT Pub. Date: Jun. 23, 2011

(65) Prior Publication Data
US 2012/0229720 A1  Sep. 13, 2012

(30) Foreign Application Priority Data
Dec. 16, 2009  (KR) .................. 10-2009-0125626

(51) Int. Cl.
*G02F 1/1335* (2006.01)
*G02F 1/133* (2006.01)
*G02F 1/1333* (2006.01)

(52) U.S. Cl.
USPC ............... 349/15; 349/31; 349/110; 349/111

(58) Field of Classification Search
CPC .......... G02F 1/133348; G02F 1/10333; G02F 1/13334; G02F 1/136209; G02F 1/133512; G02F 2001/133388; G02B 27/2214; H04N 13/0404
USPC ...................... 349/15, 31, 110, 111
See application file for complete search history.

(56) References Cited

U.S. PATENT DOCUMENTS

| | | | | |
|---|---|---|---|---|
| 6,055,103 | A * | 4/2000 | Woodgate et al. | 359/489.07 |
| 7,787,064 | B2 * | 8/2010 | Kwon et al. | 349/15 |
| 7,940,342 | B2 * | 5/2011 | Lee | 349/15 |
| 7,954,967 | B2 * | 6/2011 | Kashiwagi et al. | 362/97.1 |
| 2009/0279025 | A1 | 11/2009 | Machidori et al. | |
| 2012/0147281 | A1* | 6/2012 | Matsuhiro et al. | 349/15 |

* cited by examiner

*Primary Examiner* — Mike Qi
(74) *Attorney, Agent, or Firm* — IPLA P.A.; James E. Bame

(57) ABSTRACT

A multi-mode 3-dimensional image display apparatus comprises a backlight for emitting light; an image liquid crystal panel for displaying an image using the light emitted from the backlight; and a parallax barrier liquid crystal panel including a first transparent substrate, a first transparent electrode plate disposed on the first transparent substrate and having a front surface formed as a transparent electrode, a first insulation plate disposed on the first transparent electrode plate, a second transparent electrode plate disposed on the first insulation plate and having a transparent electrode material patterned in parallel in a vertical direction, a first alignment layer disposed on the second transparent electrode plate, a liquid crystal layer disposed on the first alignment layer, a second alignment layer disposed on the liquid crystal layer, a third transparent electrode plate disposed on the second alignment layer and having a transparent electrode material patterned in parallel in a vertical direction, in which the transparent electrode material is patterned so as to overlap a certain area with an area of the second transparent electrode plate patterned with the transparent electrode material, a second insulation plate disposed on the third transparent electrode plate, a fourth transparent electrode plate disposed on the second insulation plate and having a front surface formed as a transparent electrode, a second transparent substrate disposed on the fourth transparent electrode plate, and a polarizer plate disposed on the second transparent substrate.

3 Claims, 4 Drawing Sheets

MULTI-MODE 3-DIMENSIONAL IMAGE DISPLAY APPARATUS

BACKGROUND OF THE INVENTION

1. Field of the Invention

The present invention relates to a multi-mode 3-dimensional image display apparatus, and more specifically, to a multi-mode 3-dimensional image display apparatus, in which two sheets of transparent electrode substrates patterned with a transparent electrode material in parallel in the vertical direction are disposed so as to overlap the areas patterned with the transparent electrode material with each other, and thus a 3-dimensional image is effectively displayed when an observer observes the 3-dimensional image while moving.

2. Background of the Related Art

Generally, since two eyes of a person are spaced apart from each other by about 65 mm, each of the eyes sees a different surface of an object when the person sees the object, and thus the person feels a 3-dimensional effect. This is called as a binocular disparity caused by both of the left and right eyes, and the binocular disparity is perceived as an image having a feeling of 3-dimensional effect as the images acquired by the two eyes are synthesized in the brain. A 3-dimension image can be displayed based on such a principle.

The techniques for displaying a 3-dimension image include a stereoscopic technique, an auto-stereoscopic technique and the like. The stereoscopic technique uses disparity images of the left and right eyes having a largest 3-dimensional effect. Among the stereoscopic techniques, a 3-dimensional image display apparatus of a parallax barrier technique is spotlighted.

However, a 3-dimensional image display apparatus of a conventional parallax barrier technique is difficult to effectively observe a 3-dimensional image if an object is not positioned within a range of accurate viewing angles. Particularly, when an observer (e.g., a doctor) with a 3-dimensional endoscope observes a 3-dimensional image while moving, it is difficult to accurately observe the 3-dimensional image.

SUMMARY OF THE INVENTION

Therefore, the present invention has been made in view of the above problems, and it is an object of the present invention to provide a multi-mode 3-dimensional image display apparatus, in which two sheets of transparent electrode substrates patterned with a transparent electrode material in parallel in the vertical direction are disposed so as to overlap the areas patterned with the transparent electrode material with each other, and thus a 3-dimensional image is effectively displayed when an observer observes the 3-dimensional image while moving.

The technical problems to be solved in the present invention are not limited to those described above, and other unmentioned technical problems may be apparently understood by those skilled in the art from the descriptions described below.

To accomplish the above object, according to one aspect of the present invention, there is provided a multi-mode 3-dimensional image display apparatus comprising: a backlight for emitting light; an image liquid crystal panel for displaying an image using the light emitted from the backlight; and a parallax barrier liquid crystal panel including a first transparent substrate, a first transparent electrode plate disposed on the first transparent substrate and having a front surface formed as a transparent electrode, a first insulation plate disposed on the first transparent electrode plate, a second transparent electrode plate disposed on the first insulation plate and having a transparent electrode material patterned in parallel in a vertical direction, a first alignment layer disposed on the second transparent electrode plate, a liquid crystal layer disposed on the first alignment layer, a second alignment layer disposed on the liquid crystal layer, a third transparent electrode plate disposed on the second alignment layer and having a transparent electrode material patterned in parallel in a vertical direction, in which the transparent electrode material is patterned so as to overlap a certain area with an area of the second transparent electrode plate patterned with the transparent electrode material, a second insulation plate disposed on the third transparent electrode plate, a fourth transparent electrode plate disposed on the second insulation plate and having a front surface formed as a transparent electrode, a second transparent substrate disposed on the fourth transparent electrode plate, and a polarizer plate disposed on the second transparent substrate.

In the multi-mode 3-dimensional image display apparatus according to an embodiment of the present invention, the area patterned with a transparent electrode material and an area not patterned with a transparent electrode material are disposed on the second transparent electrode plate preferably at a ratio of 2 to 1.

In the multi-mode 3-dimensional image display apparatus according to an embodiment of the present invention, an area patterned with a transparent electrode material and an area not patterned with a transparent electrode material are disposed on the third transparent electrode plate at a ratio of 2 to 1, and an area of the third transparent electrode plate is overlapped with the area of the second transparent electrode plate patterned with the transparent electrode material preferably by 40 to 60%.

DETAILED DESCRIPTION OF THE PREFERRED EMBODIMENT

Figure 1:
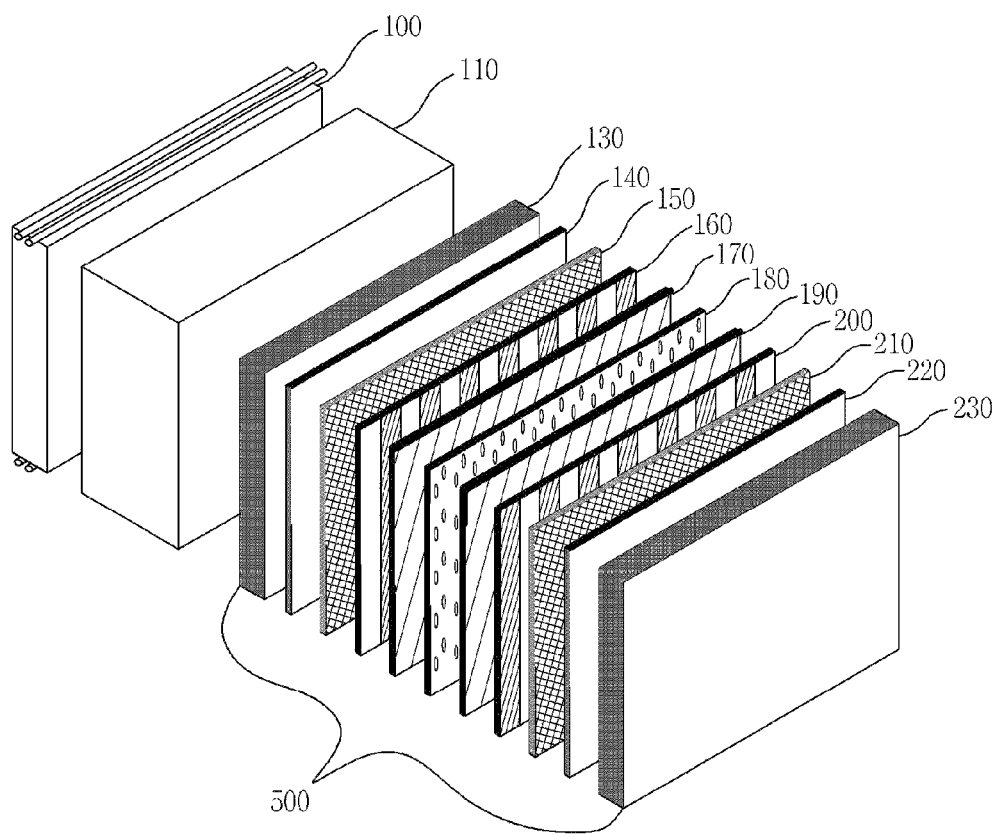
FIG. 1 is a perspective view showing a multi-mode 3-dimensional image display apparatus according to an embodiment of the present invention.

Preferred embodiments of the present invention will be described below in more detail with reference to the accompanying drawings. Details of the other embodiments are included in the detailed descriptions and figures. Advantages and features of the present invention, and implementation methods thereof will be clarified through following embodiments described with reference to the accompanying drawings. Like reference numerals refer to like elements throughout.

Figure 2:
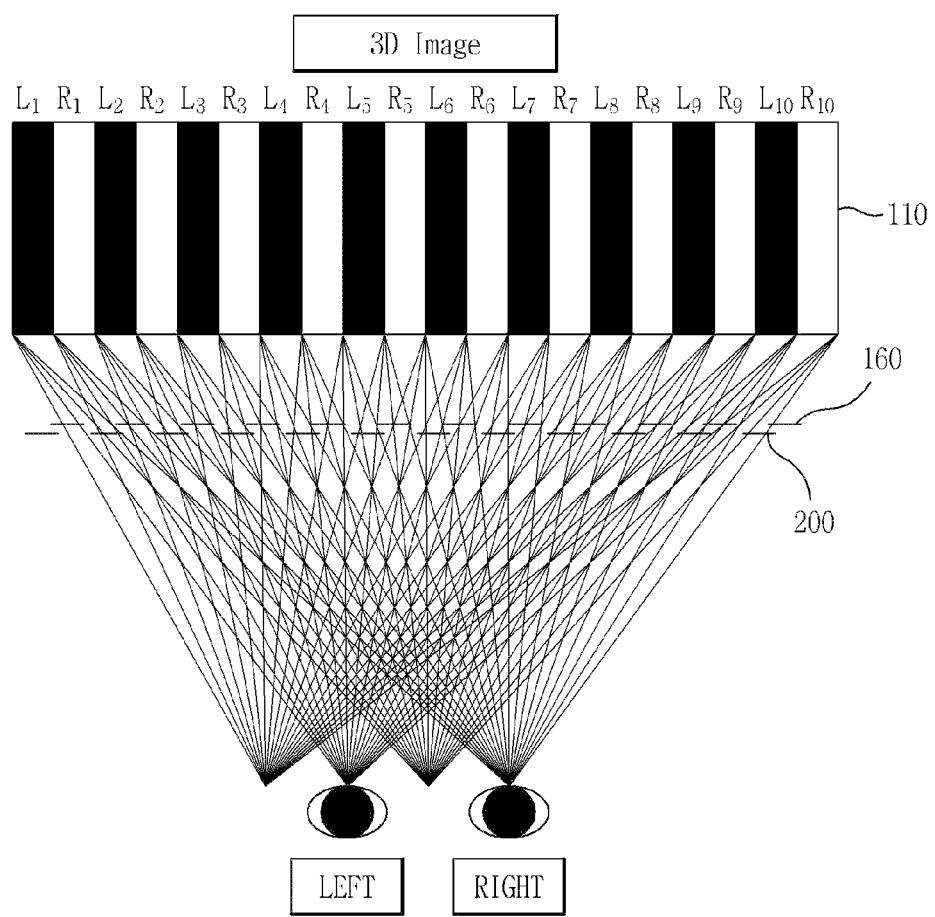
FIG. 2 is a view showing an operation of the multi-mode 3-dimensional image display apparatus of FIG. 1.
Figure 3:
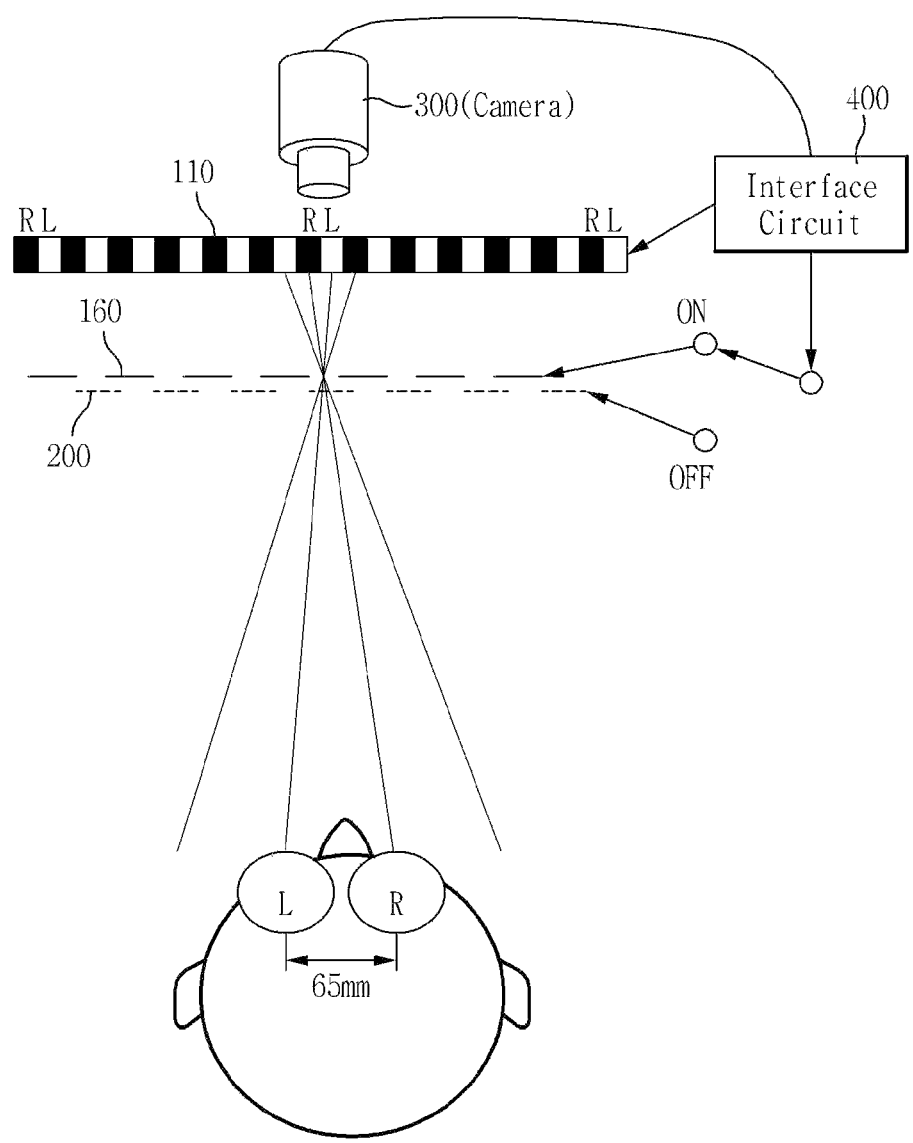
FIG. 3 is a view showing a connection state between the multi-mode 3-dimensional image display apparatus of FIG. 1 and a camera.
Figure 4:
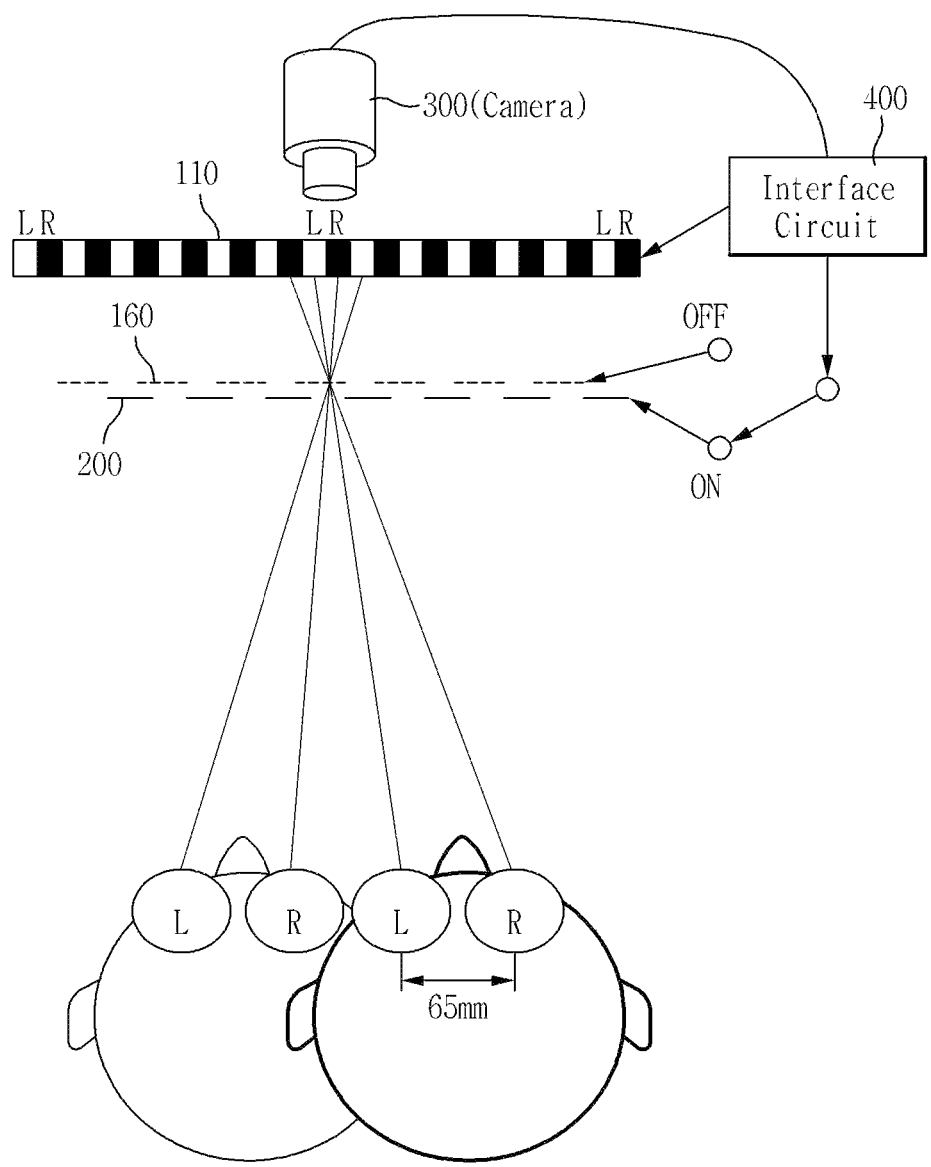
FIG. 4 is a view showing an observer of the multi-mode 3-dimensional image display apparatus of FIG. 1 moving left or right.

FIG. 1 is a perspective view showing a multi-mode 3-dimensional image display apparatus according to an embodiment of the present invention, FIG. 2 is a view showing an operation of the multi-mode 3-dimensional image display apparatus of FIG. 1, FIG. 3 is a view showing a connection state between the multi-mode 3-dimensional image display apparatus of FIG. 1 and a camera, and FIG. 4 is a view showing an observer of the multi-mode 3-dimensional image display apparatus of FIG. 1 moving left or right.

As shown in FIG. 1, a 3-dimensional image display apparatus according to an embodiment of the present invention may include a backlight 100, an image liquid crystal panel 110 and a barrier liquid crystal panel 500.

Here, the backlight 100 emits light, and a Cold Cathode Fluorescent Lamp (CCFL), an External Electrode Fluorescent Lamp (EEFL), a Light Emitting Diode (LED) or the like can be used as a light source.

Meanwhile, the image liquid crystal panel 110 defines pixels for displaying an image using the light emitted from the backlight 100 in the form of a matrix. Each pixel is provided with an opposing pixel and a common electrode with the intervention of a liquid crystal layer, and a thin film transistor (TFT) for switching the driving voltage transferred to each pixel electrode may be provided.

In addition, the barrier liquid crystal panel 500 includes a first transparent substrate 130, a first transparent electrode plate 140, a first insulation plate 150 disposed on the first transparent electrode plate 140, a second transparent electrode plate 160, a first alignment layer 170, a liquid crystal layer 180, a second alignment layer 190, a third transparent electrode plate 200, a second insulation plate 210, a fourth transparent electrode plate 220, a second transparent substrate 230, and a polarizer plate 240.

Meanwhile, the first transparent electrode plate 140 is disposed on the first transparent substrate 130 and has a front surface formed as a transparent electrode, and the first insulation plate 150 is disposed on the first transparent electrode plate 140. The second transparent electrode plate 160 is disposed on the first insulation plate 150 and has a transparent electrode patterned in parallel in the vertical direction. The first alignment layer 170 is disposed on the second transparent electrode plate 160, and the liquid crystal layer 180 is disposed on the first alignment layer 170. Here, the liquid crystal layer 180 may be formed of a twisted nematic (TN) liquid crystal.

Meanwhile, an area patterned with a transparent electrode material and an area not patterned with a transparent electrode material may be disposed on the second transparent electrode plate 160 approximately at a ratio of 2 to 1.

In addition, the second alignment layer 190 is disposed on the liquid crystal layer 180, and the third transparent electrode plate 200 has a transparent electrode material patterned in parallel in the vertical direction. The transparent electrode material is patterned so as to overlap a certain area of the third transparent electrode plate 200 with the area of the second transparent electrode plate 160 patterned with the transparent electrode material.

Specifically, an area patterned with a transparent electrode material and an area not patterned with a transparent electrode material are disposed on the third transparent electrode plate 200 approximately at a ratio of 2 to 1, and an area of the third transparent electrode plate 200 is overlapped with the area of the second transparent electrode plate 160 patterned with the transparent electrode material preferably by 40 to 60%, and further preferably by 50%.

Meanwhile, the second insulation plate 210 is disposed on the third transparent electrode plate 200, and the fourth transparent electrode plate 220 is disposed on the second insulation plate 210 and has a front surface formed as a transparent electrode. The second transparent substrate 230 is disposed on the fourth transparent electrode plate 220, and the polarizer plate 240 is disposed on the second transparent substrate 230.

As shown in FIG. 2, in the multi-mode 3-dimensional image display apparatus according to an embodiment of the present invention, the area of the second transparent electrode plate 160 patterned with a transparent electrode material, in which a ratio of the area patterned with a transparent electrode material to the area not patterned with a transparent electrode material is 2 to 1, and the area of the third transparent electrode plate 200 patterned with a transparent electrode material, in which a ratio of the area patterned with a transparent electrode material to the area not patterned with a transparent electrode material is 2 to 1, are disposed so as to overlap with each other by about 40 to 60%, and thus a 3-dimensional image may be effectively displayed when an observer observes the 3-dimensional image while moving.

The multi-mode 3-dimensional image display apparatus according to an embodiment of the present invention disposes right images R and left images L on the image liquid crystal panel 110 at regular intervals and installs a camera 300 for recognizing a position of an observer in the middle of the image liquid crystal panel 110 combined with the parallax barrier liquid crystal panel 500 as shown in FIG. 3. If the multi-mode 3-dimensional image display apparatus traces the position of the observer and applies a driving signal to the second transparent electrode plate 160 and the fourth transparent electrode plate 220 of the parallax barrier liquid crystal panel 500 through an interface circuit 400 based on the traced position information, the observer may observe an accurate 3-dimensional image. If the observer moves left or right as shown in FIG. 4, the position recognition camera 300 detects the movement, and a driving signal is applied to the first transparent electrode plate 140 and the third transparent electrode plate 200 of the parallax barrier liquid crystal panel 500 through the interface circuit 400 based on the movement information. Then, if positions of the right images R and the left images L are exchanged with each other on the image liquid crystal panel 110, the observer may observe an accurate 3-dimensional image.

In the multi-mode 3-dimensional image display apparatus according to the embodiments of the present invention, two sheets of transparent electrode substrates patterned with a transparent electrode material in parallel in the vertical direction are disposed so as to overlap the areas patterned with the transparent electrode material with each other, and thus a 3-dimensional image is effectively displayed when an observer observes the 3-dimensional image while moving.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A multi-mode 3-dimensional image display apparatus comprising:
   a backlight for emitting light;
   an image liquid crystal panel for displaying an image using the light emitted from the backlight; and
   a parallax barrier liquid crystal panel including a first transparent substrate, a first transparent electrode plate disposed on the first transparent substrate and having a front surface formed as a transparent electrode, a first insulation plate disposed on the first transparent electrode plate, a second transparent electrode plate disposed on the first insulation plate and having a transparent electrode material patterned in parallel in a vertical direction, a first alignment layer disposed on the second transparent electrode plate, a liquid crystal layer disposed on the first alignment layer, a second alignment layer disposed on the liquid crystal layer, a third transparent electrode plate disposed on the second alignment layer and having a transparent electrode material patterned in parallel in a vertical direction, in which the transparent electrode material is patterned so as to overlap a certain area with an area of the second transparent electrode plate patterned with the transparent electrode material, a second insulation plate disposed on the third transparent electrode plate, a fourth transparent electrode plate disposed on the second insulation plate and having a front surface formed as a transparent electrode, a second transparent substrate disposed on the fourth transparent electrode plate, and a polarizer plate disposed on the second transparent substrate.

2. The apparatus according to claim 1, wherein the area patterned with a transparent electrode material and an area not patterned with a transparent electrode material are disposed on the second transparent electrode plate at a ratio of 2 to 1.

3. The apparatus according to claim 1, wherein the area patterned with a transparent electrode material and an area not patterned with a transparent electrode material are disposed on the third transparent electrode plate at a ratio of 2 to 1, and the area of the third transparent electrode plate is overlapped with the area of the second transparent electrode plate patterned with the transparent electrode material by 40 to 60%.

* * * * *